United States Patent [19]
Taupin et al.

[11] Patent Number: 6,104,408
[45] Date of Patent: Aug. 15, 2000

[54] PROCESS AND DEVICE FOR DETERMINING THE CONTOUR OF VALLEYS OF A SPECIFIED GEOGRAPHICAL AREA AND APPLICATIONS

[75] Inventors: Christian Taupin, Jouy en Josas; Céline Boucton, Le Mans; Etienne Epitalon, Paris; Coralie Fritz, Strasbourg, all of France

[73] Assignee: Societe Nationale Industrielle et Aerospatiale, Paris, France

[21] Appl. No.: 09/035,784

[22] Filed: Mar. 6, 1998

[30] Foreign Application Priority Data

Mar. 6, 1997 [FR] France ................... 97 02666

[51] Int. Cl.$^7$ ....................................... G01V 3/18
[52] U.S. Cl. ................. 345/429; 340/995; 702/5
[58] Field of Search ............... 345/429; 340/995; 702/5

[56] References Cited

U.S. PATENT DOCUMENTS 4,698,759  10/1987  Eliason et al. .................. 364/420
5,402,340  3/1995   White et al. .................... 364/420

FOREIGN PATENT DOCUMENTS

WO9304437  4/1993  WIPO .

OTHER PUBLICATIONS

Philippe Guillotel, et al., "A Method for the Extraction of a Hydrographical Network from Digital Elevation Model," Remote Sensing: An Economic Tool For The Nineties, Vancouver, Jul. 10–14, 1989, Electrical and Electronics Engineers, pp. 442–445.

In So Kweon, et al., "Extracting Topographic Terrain Features from Elevation Maps," CVGIP Image Understanding, vol. 59, No. 2, Mar. 1994, pp. 171–182.

Primary Examiner—Mark R. Powell
Assistant Examiner—Lance W. Sealey
Attorney, Agent, or Firm—Stevens, Davis, Miller & Mosher, L.L.P.

[57] ABSTRACT

The present invention relates to a process and to a device for determining the contour of valleys of a specified geographical area. According to the invention, said device comprises:

- means for determining the hydrographic net of the geographical area which is presented in a first matrix which includes, at each point liable to form part of a watercourse, a characteristic code designating said watercourse;
- means for forming a second matrix which includes at each point the altitude of the corresponding part of said geographical area; and
- means for determining, from said first and second matrices, the contours of the valleys.

17 Claims, 7 Drawing Sheets

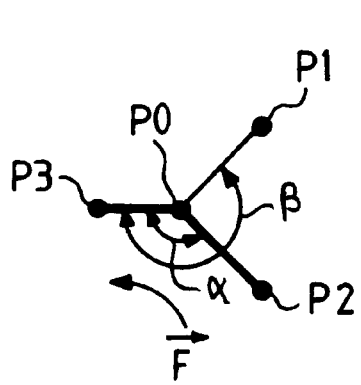
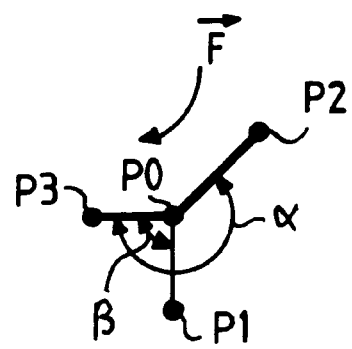
FIG.4A    FIG.4B
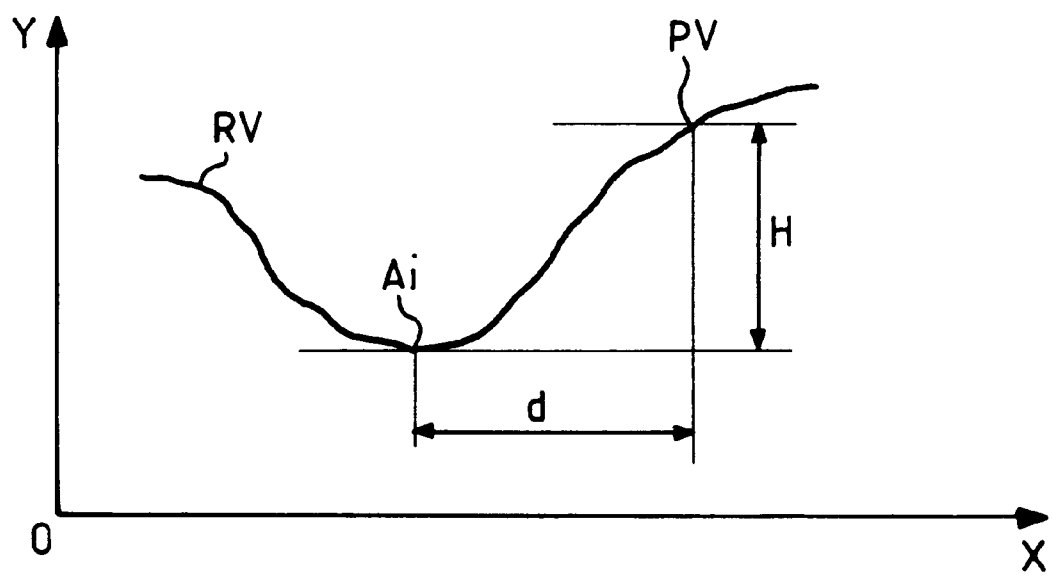
FIG.5

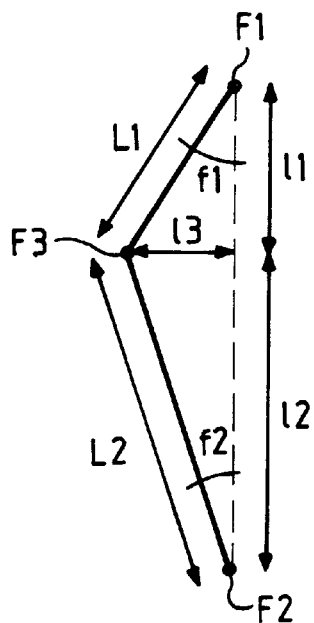 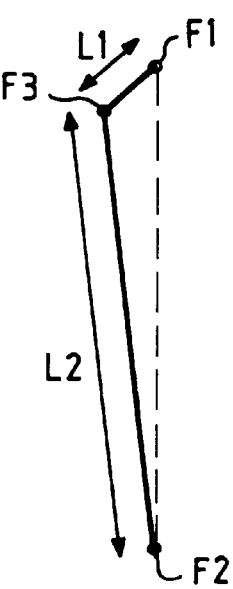
FIG.8A  FIG.8B  FIG.8C
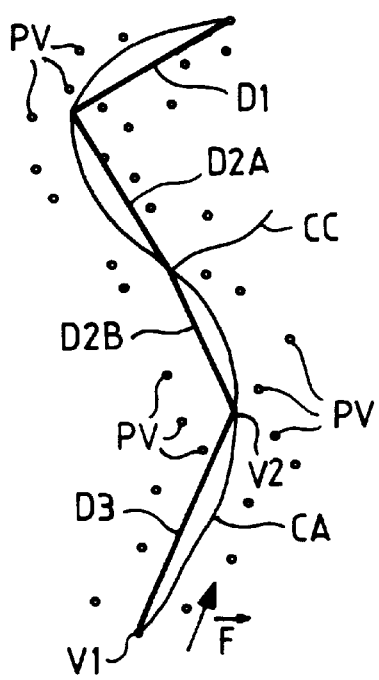 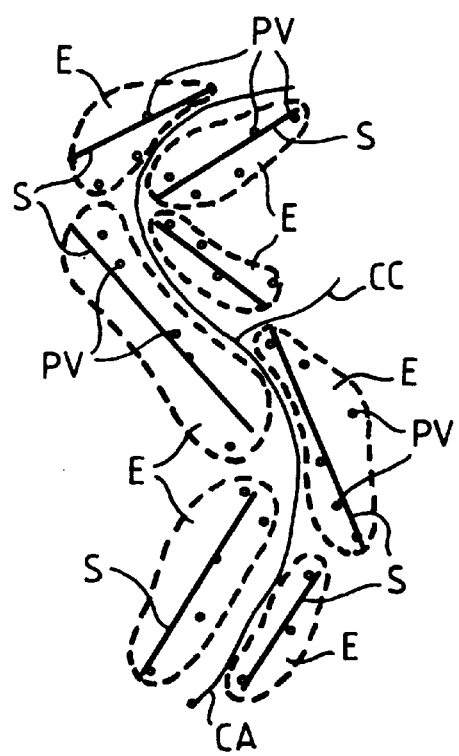
FIG.9  FIG.10

PROCESS AND DEVICE FOR DETERMINING THE CONTOUR OF VALLEYS OF A SPECIFIED GEOGRAPHICAL AREA AND APPLICATIONS

FIELD OF THE INVENTION

The present invention relates to a process for determining the contour of valleys of a specified geographical area and a device for implementing said process, as well as to applications of the latter.

BACKGROUND OF THE INVENTION

A knowledge of the contour of the valleys of a specified geographical area is very useful in particular in respect of flying craft, especially missiles, which follow the terrain, since the paths defined by said contours of the valleys afford protection to said flying craft and make them difficult to detect in particular by means of radars.

Such contours of valleys may in particular be used when preparing a mission for a missile of the air-to-ground type, by making it possible to define penetration routes for a possible air-to-ground attack.

It will be noted that, in order to obtain satisfactory implementation of such a process, the latter must moreover be usable by any type of flying craft without requiring excessive modifications.

SUMMARY OF THE INVENTION

Thus, the present invention relates to a process for determining, in a rapid, simple, reliable and low-cost manner, the contour of valleys of a specified geographical area.

To this end, according to the invention, said process is noteworthy in that:

A/ the probable hydrographic net of said geographical area is determined, said hydrographic net being presented in a first matrix which represents said geographical area and which includes at each matrix point, corresponding to a part of said geographical area liable to form part of a watercourse, a characteristic code designating said watercourse;

B/ a second matrix is formed which represents said geographical area and which includes at each matrix point the altitude of the corresponding part of said geographical area;

C/ the tributaries and the points of confluence of all the watercourses of said hydrographic net are determined from said first matrix;

D/ valley points are determined in said matrices from said first and second matrices, the parts of the geographical area corresponding to said valley points being liable to belong to a valley contour;

E/ valley contour segments are defined on the basis of the valley points thus determined, as well as of said tributaries and said points of confluence; and F/ said valley contours are formed on the basis of the segments thus defined.

Thus, by virtue of the invention, said valley contours may be determined easily and accurately.

Moreover, said process can be implemented in respect of any type of flying craft. To this end, certain characteristics, especially the flying height and maneuverability of the flying craft considered can in particular be taken into account in the aforementioned step D/, as will be seen below.

Furthermore, advantageously:

in step A/, said hydrographic net is determined using a map display and processing unit which uses information from digitized data files of said geographical area and which simulates the flow of rain over the relief of said geographical area; and/or in step B/, said second matrix is likewise determined from information from digitized data files of said geographical area.

Moreover, advantageously, in step C/, in order to determine the tributaries, the following operations are carried out for each of the watercourses of the hydrographic net:

each matrix point of said first matrix labeled with the code of said watercourse is taken into account in succession; and for each of the matrix points thus taken into account, the following operations are carried out:

a partial area, of predefined size, centered about said matrix point is defined in said first matrix;

the existence of an additional matrix point labeled with the code of another watercourse is searched for within said partial area; and if such an additional matrix point is present in said partial area, it is deduced therefrom that it belongs to a tributary.

In this case, advantageously, a point of confluence corresponds to the first of said matrix points taken into account in the search for a tributary, on the basis of which such a tributary is detected.

Moreover, according to the invention, in step D/:

a) the principal directions of said watercourses are determined in said first matrix;

b) said first and second matrices are superimposed; and c) on the basis of said superposition, for each water point corresponding to a matrix point representative of a watercourse, a sweep is carried out over said second matrix, orthogonally to the principal direction of said watercourse at said water point, in succession on either side of said watercourse, while searching during this sweep, up to a predefined distance from said water point, for a matrix point having a relative altitude with respect to said water point which lies within a predetermined altitude bracket, any first matrix point thus detected on the basis of said water point corresponding to a valley point.

In this case, when a watercourse (either that from which the search is started or another watercourse) is encountered in the course of the sweep on one side of a principal direction of a watercourse, the search for the water point considered on this side of the principal direction is halted.

It will be noted that said altitude bracket can be defined as a function of characteristics of a flying craft, in respect of which the process in accordance with the invention is implemented.

Furthermore, advantageously, in step E/:

a) the principal directions of said watercourses are determined;

b) for each of said principal directions, the valley points adjacent to this latter on one side of the watercourse are grouped together so as to form a set of valley points; and c) for each of said sets of valley points, a segment is determined which approximates the valley points of said set and represents a valley contour segment.

Moreover, according to the invention, when implementing the aforementioned steps D/ and E/, in order to determine the principal directions of a watercourse, on the basis of water points corresponding to the matrix points of said first matrix which are labeled with the code of said watercourse:

a) the two extreme water points of said watercourse are determined;

b) a segment is formed on the basis of said extreme water points;

c) a search is made for the water point furthest from the segment thus formed;

d) two segments are formed on the basis of said furthest water point and of said extreme water points respectively; and e) for each of the segments thus formed, the operations c), d) and e) are repeated as long as:

on the one hand, the length of the segments thus formed is greater than a predefined value; and on the other hand, the angles between a segment considered in step c) and each of the segments formed in the succeeding step d) are greater than a predefined value, the segments obtained at the end of said repetitive operations representing the principal directions of said watercourse.

Furthermore, for the aforementioned operation E/:

in step E/b), for a watercourse considered, the valley points which on each occasion are situated between two of the following situations, appearing consecutively, are grouped together:

a start of watercourse;

a change of direction of the watercourse, a change of direction corresponding to the crossover point of two adjacent principal directions;

a tributary; and an end of watercourse; and/or in step E/c), the segment which approximates the valley points of a set of valley points is determined through a least squares computation.

Preferably, said segment is limited in length by the contour of said set of valley points.

Moreover, in step F/of the process in accordance with the invention, each valley contour is formed by contour pieces, and each contour piece is obtained from two adjacent valley contour segments.

To this end, according to the invention, in order to form a contour piece from two adjacent valley contour segments, a check is made as to whether they intersect; and, each of said segments containing an end far from and an end near to the other:

in the case in which they intersect, the contour piece is formed from three successive straight-line portions which respectively join the far end of the first segment, the near end of the second segment, the near end of the first segment and the far end of the second segment; and in the case in which they do not intersect, the imaginary point of intersection is determined, obtained by fictitiously extending at least one of said two segments; and if said point of intersection lies on a first of said segments, the contour piece is formed of said first segment and of a straight-line portion joining the near end of this first segment to the far end of the second segment; and if said point of intersection does not lie on one of said two segments:

in the case in which it is obtained by extending the two near ends of said segments, the contour piece is formed of these two segments, together with a straight-line portion joining the near ends of these segments; and in the case in which it is obtained by extending the near end of a first segment and the far end of the second segment, the contour piece is formed of said second segment and of a straight-line portion joining the far end of the first segment to the near end of the second segment.

The present invention also relates to a device for implementing the aforementioned process.

To this end, according to the invention, said device is noteworthy in that it comprises:

means for forming said first matrix;

means for forming said second matrix;

means for determining the tributaries and the points of confluence of the watercourses of the hydrographic net;

means for determining said valley points;

means for defining the valley contour segments; and means for forming the valley contours.

Thus, by virtue of the invention, a reliable and low-cost device is obtained.

Moreover, the present invention also relates to two applications of the aforementioned process.

A first application relates to a process for determining inclines. To do this, according to the invention, during the implementation of the aforementioned process, the valley walls are determined which exhibit a slope greater than a predefined value, the valley walls thus determined forming said inclines.

A second application relates to a process for determining ridge lines.

To this end, according to the invention, the aforementioned process is implemented, taking into account the following characteristics:

in step D/, ridge points corresponding to the matrix points of said second matrix, exhibiting the highest altitude, are determined instead of valley points;

said ridge points are used in step E/ instead of the valley points; and said ridge lines correspond to the contours formed in step F/.

BRIEF DESCRIPTION OF THE DRAWING

The figures of the appended drawing will elucidate the manner in which the invention may be practiced. In these figures, identical references denote similar elements.

FIGS. 4A and 4B illustrate a method of determining that bank of a principal watercourse on which a tributary is situated.

FIG. 5 shows in section a vertical plane illustrating the relief of a valley.

FIGS. 8A to 8C illustrate a method of determining the principal directions to a watercourse.

FIG. 9 illustrates the result obtained from the processing operations presented in FIGS. 8A to 8C.

FIG. 10 shows a watercourse together with the sets of valley points and the corresponding contour segments.

FIG. 11A to 14A illustrate various possible arrangements of pairs of adjacent contour segments.

FIG. 11B to 14B illustrate the contour pieces obtained on the basis of the contour segment pairs illustrated in FIG. 11A to 14A respectively.

DESCRIPTION OF THE PREFERRED EMBODIMENT

Figure 1:
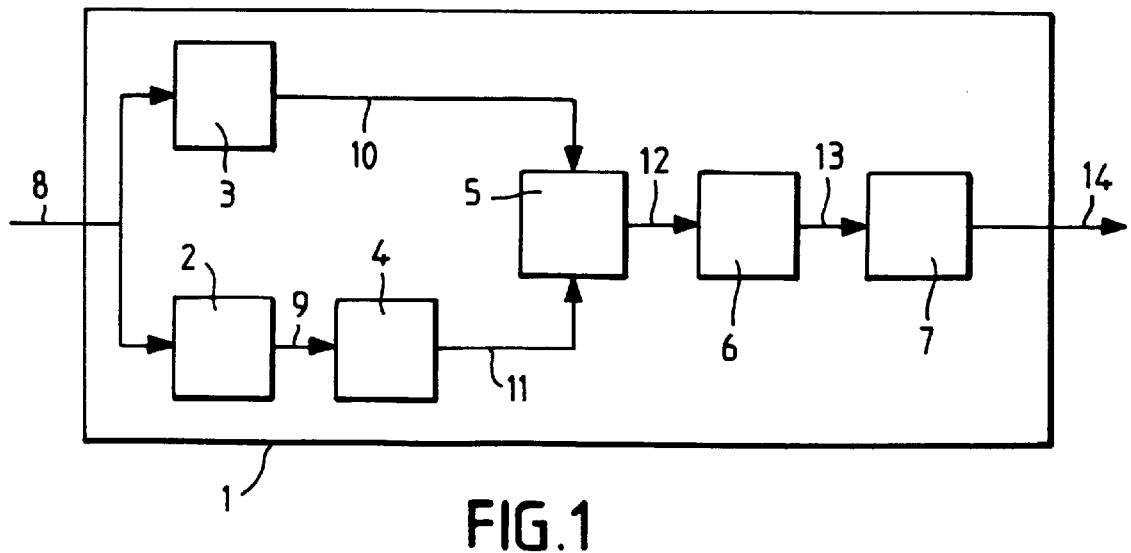
FIG. 1 is the schematic diagram of a device in accordance with the invention.

The device 1 in accordance with the invention and represented diagrammatically in FIG. 1 is intended to determine in an automatic manner the contour of valleys of a specified geographical area ZI.

This device 1 can in particular be used when preparing a mission for a flying craft (not represented), in particular a missile, which flies in terrain-following mode.

More generally, the device 1 in accordance with the invention must be usable by any type of flying craft, simply by taking into account a few characteristics of said flying craft.

Figure 2:
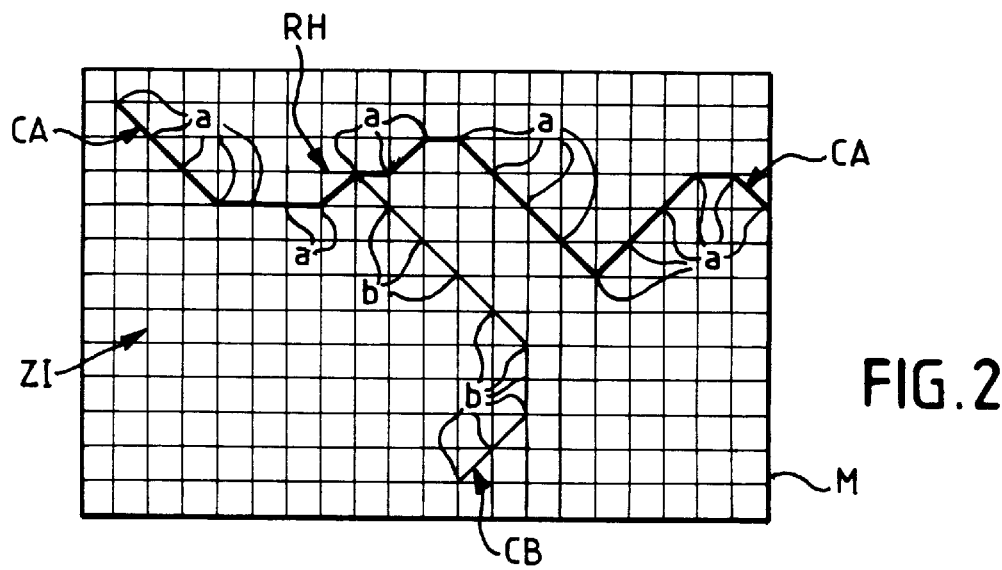
FIG. 2 illustrates a first matrix in accordance with the invention and exhibiting the hydrographic net of a specified geographical area.

To this end, said device 1 comprises, according to the invention:

means 2 for determining the probable hydrographic net RH of said geographical area ZI, said hydrographic net RH being presented on a first matrix M represented in FIG. 2;

means 3 for forming a second matrix which represents said geographical area ZI and which includes at each matrix point the altitude of the corresponding part of said geographical area ZI;

means 4 for determining, from said first matrix M, the tributaries and the points of confluence of all the watercourses of said hydrographic net RH;

means 5 for determining, from said first and second matrices, valley points PV in said matrices, the parts of the geographical area corresponding to said valley points PV being liable to belong to a valley contour;

means 6 for defining, on the basis of the valley points PV thus determined, and also of said tributaries and said points of confluence, valley contour segments T; and means 7 for forming, from the segments T thus defined, said contours CV of the valleys.

More precisely:

the means 2 are made in the form of a map display and processing unit, of known type, which uses information from digitized data files (not represented), of said geographical area ZI, said information being received from these files by way of a link 8, and which simulates the flow of rain over the relief of said geographical area ZI; and said first matrix M which is represented in FIG. 2 illustrates said geographical area ZI and includes at each matrix point, corresponding to a part of said geographical area ZI liable to form part of a watercourse, a characteristic code a or b designating said watercourse CA or CB. The hydrographic net RH represented in FIGS. 2 and 3 of said geographical area ZI therefore includes the watercourses CA and CB.

It will be noted that said means 2 determine the probable watercourses, that is to say those which are liable to exist on the basis of the characteristics of the relief. They therefore also take into account a watercourse which has given rise to a valley and which currently no longer exists. This is because, in the implementation of the invention, it is not the concept of water which is predominant, but that of a valley bed.

It will be observed in this respect that hydrographic databases are not of interest in the implementation of the invention, since such databases contain only existing watercourses.

Furthermore, the means 3 determine said second matrix likewise on the basis of information from digitized data files of said geographical area ZI and received via the link 8.

The first matrix M thus determined is transmitted, by way of a link 9, to the means 4 which determine the tributaries and the points of confluence of the watercourses A and B of the hydrographic net RH.

Figure 3:
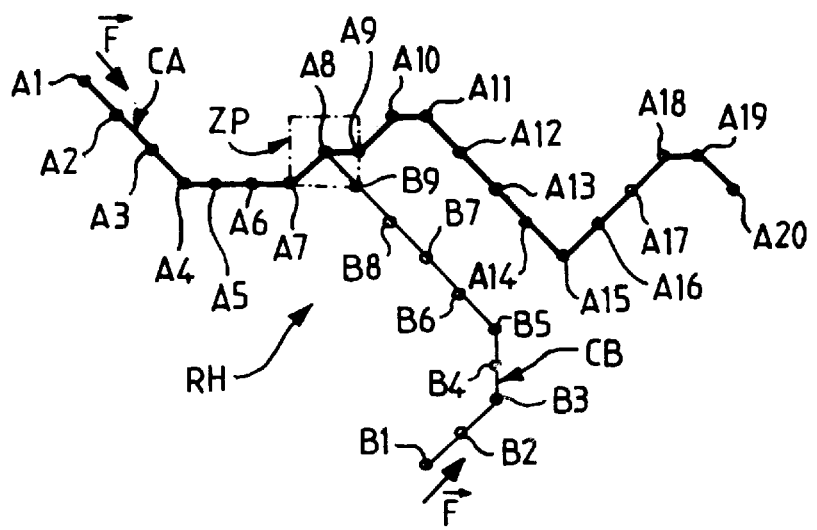
FIG. 3 illustrates a method of determining tributaries and points of confluence from the hydrographic net of FIG. 2.

To this end, said means 4 carry out, as represented in FIG. 3, for each of the watercourses CA and CB of the hydrographic net RH, the following operations described below for watercourse CA:

they take into account in succession, for example in the direction $\vec{F}$ of flow of the water, each matrix point A1 to A20 of said first matrix M, labeled with the code a of said watercourse CA; and for each of the matrix points A1 to A20 thus taken into account, they carry out the following operations:

they define in said first matrix M a partial area ZP, as represented in respect of point A8, of preferably square predefined size, centered about said matrix point A8;

in said partial area ZP, they search for the existence of an additional matrix point labeled with the code of another watercourse, the point B9 of the watercourse CB, which is labeled with the code b, corresponding to such an additional matrix point, this not being the case for the point A7 which has the same code a as said point A8; and if such an additional matrix point B9 is present in said partial area ZP, they deduce from this that it belongs to a tributary CB.

Moreover, according to the invention, the first of said points A1 to A20, on the basis on which a tributary is detected, is regarded as a point of confluence. In the example represented in FIG. 3, the point A8 therefore corresponds to the point of confluence of the watercourses CA and CB.

Furthermore, the means 4 determine, moreover, for each tributary CB determined, that bank of the watercourse CA on which it is situated.

To do this, said means 4 take into account the following points represented in FIGS. 4A and 4B:

the point of confluence P0, that is to say the point A8 in the example of FIG. 3;

a point P1 of the tributary, for example point B9 of FIG. 3;

a point P2 (for example point A7) of the principal watercourse, upstream of the point of confluence P0; and a point P3 (for example point A9) of the principal watercourse, downstream of the point of confluence P0.

Next, they determine the angles:

α, between the segments P0P2 and P0P3; and

β, between the segments P0P1 and P0P3, and from this they deduce:

if α is less than β, such as represented in FIG. 4A, that the tributary P0P1 is situated on the right bank of the principal watercourse P2P3; and if α is greater than β, such as represented in FIG. 4B, that the tributary P0P1 is situated on the left bank of the principal watercourse P2P3.

To determine the angles α and β, the means 4 firstly compute the vectors P0 $\vec{P1}$, P0 $\vec{P2}$ and P0 $\vec{P3}$ from the coordinates of the points P0, P1, P2 and P3, and from this they then deduce said angles α and β from known trigonometric formulae.

Figure 6:
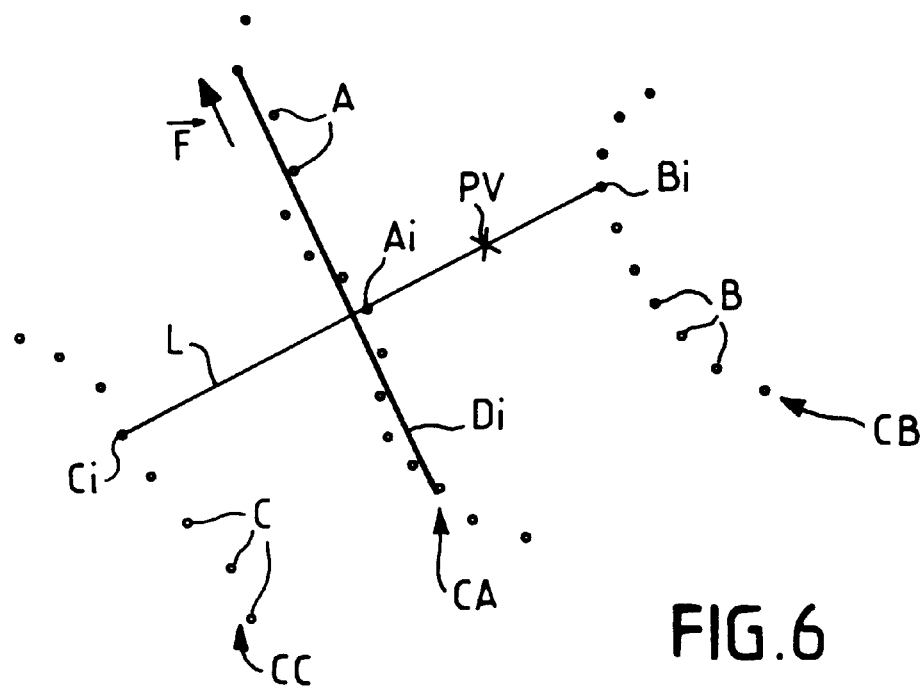
FIG. 6 illustrates a method of determining the valley points.

Moreover, the means 5 receive the information determined by the means 3 and 4 by way of links 10 and 11 respectively and they carry out the following operations:

a) they determine in said first matrix M the principal directions Di of said watercourses, as for example the directions D1, D2, D3 of the watercourse CA represented in FIG. 7, as specified below;

b) they superimpose said first and second matrices; and c) on the basis of said superposition, for each water point A corresponding to a matrix point representative of a watercourse, for example the points A1 to A20 illustrated in FIG. 3 for watercourse CA, they carry out a sweep over said second matrix as represented for a point Ai in FIG. 6, along a line L orthogonal to the principal direction Di of said watercourse CA at said water point Ai, in succession on either side of said watercourse CA. During said sweep over a bank of the watercourse CA, the means 5 search, up to a predefined distance d from said water point Ai, for a matrix point PV having a relative altitude H with respect to said water point Ai lying in a predetermined altitude bracket, any first matrix point PV thus detected on the basis of the water point Ai corresponding to a valley point, such as represented in FIG. 5 which shows the relief RV of a valley in a vertical plane OXY.

Said predetermined altitude bracket may be chosen as a function of characteristics (flying height, maneuverability, etc) of a flying body, for example a missile, which makes use of the results obtained by the device 1.

It is known that an air-to-ground missile moving in terrain-following mode flies at a minimum flight altitude for stealth and to ensure the security thereof. In this case, the relative altitude H must necessarily be greater than this minimum value. It can for example be equal to 50 meters.

The predefined distance d, for example 2500 meters, is chosen so that only valleys exhibiting a considerable slope are taken into account.

Furthermore, when a watercourse, for example the watercourse CC at the point Ci in FIG. 6, is encountered in the course of the sweep on one side of a principal direction Di of a watercourse CA, the search for the water point Ai considered on this side (left in FIG. 6) of the principal direction Di is halted.

It will be noted that:

the watercourse encountered may also be the watercourse on the basis of which the search was started, if it exhibits considerable changes of direction;

for the point Ai of FIG. 6, the search is interrupted on the left side of the watercourse CA and on the right side, the search has revealed the point PV.

According to the invention, in order to determine the principal directions of a watercourse, on the basis of the water points of said watercourse, the following segmentation operations are carried out, implemented by the means 5 in the aforementioned step a):

a) the two extreme water points F1 and F2 of said watercourse are determined, as represented in FIG. 8A. If, by way of example, the characteristics of the watercourse CA of FIG. 3 are taken into account, said points F1 and F2 correspond to the points A1 and A20 respectively;

b) a segment F1F2 is formed on the basis of said extreme water points F1 and F2;

c) a search is made for the water point F3 furthest from the segment F1F2 thus formed;

d) two segments F3F1 and F3F2 are formed on the basis of said furthest water point F3 and of said extreme water points F1 and F2 respectively; and e) for each of the segments F3F1 and F3F2 thus formed, the operations c), d) and e) are repeated as long as:

(I) on the one hand, the length L1, L2 of the segments F3F1 and F3F2 thus formed is greater than a predefined value; and (II) on the other hand, the angles f1 and f2 between a segment F1F2 considered in step c) and each of the segments F3F1 and F3F2 formed in the succeeding step d) are greater than a predefined value, the segments obtained at the end of the segmentation processing representing the principal directions of said watercourse.

It will be noted that the angles f1 and f2 are defined respectively on the basis of the distances 11 and 13, and 12 and 13 represented in FIG. 8A. To this end, the ratios 13/11 and 13/12 are computed.

FIGS. 8A, 8B and 8C illustrate three different situations liable to arise in the aforementioned step e): -in FIG. 8A, the conditions (I) and (II) are fulfilled. Consequently, the aforementioned operations c), d) and e) are repeated on the basis of the segments F1F3 and F2F3;

in FIG. 8B, the condition (II) is not fulfilled, the angles f1 and f2 being too small. The aforementioned process is therefore halted at this stage of the segmentation; and in FIG. 8C, the condition (I) is not fulfilled, the distance L1 being too small. Likewise, in this case, the segmentation is halted at this stage of the process.

Preferably, the conditions (I) and (II) are made to depend on the size of the watercourses considered.

Figure 7:
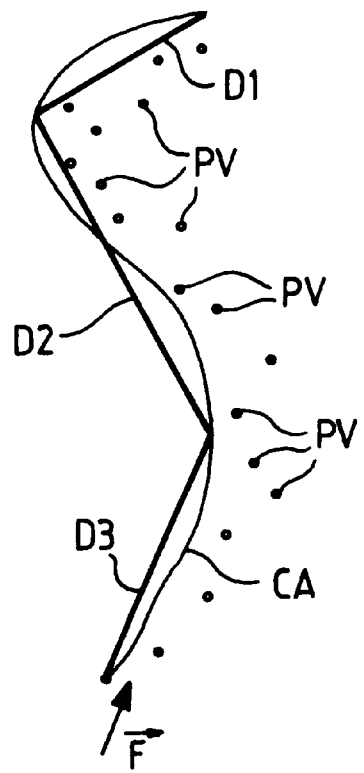
FIG. 7 shows a part of a watercourse labeled in particular with its principal directions.

Thus, the principal directions are obtained for each watercourse, as for example the directions D1, D2 and D3 represented in FIG. 7.

It is also necessary to take account of the tributaries in such a way as to be able to join a segment of a watercourse to that of a tributary close to a point of confluence, as specified below. Additionally, it is necessary to refine the aforementioned segmentation close to such a tributary. To this end, the direction D2 of FIG. 7 is transformed into two directions D2A and D2B in FIG. 9, on account of the presence of the tributary CC on the right bank.

Preferably, this segmentation is taken into account in the following processing operations only in respect of the (right) bank corresponding to that of the tributary CC. Consequently, the segmentation of FIG. 7 can be used for the processing operations relating to the left bank and that of FIG. 9 for those relating to the right bank.

At the end of the search implemented by the means 5, valley points PV are obtained on both sides of each watercourse, as represented for the right side of the watercourse CA in FIG. 7.

The means 5 transmit the valley points PV and the principal directions thus determined, by way of a link 12, to the means 6 which carry out the following operations:

a) for each of said principal directions, they group together the valley points PV adjacent to this latter on one side of the watercourse so as to form a set E of valley points PV; and b) for each of said sets E of valley points PV, they determine a segment S which approximates the valley points PV of said set E and represents a valley contour segment, such as represented in FIG. 10.

To this end, according to the invention, for a considered watercourse, the means 6 group together the valley points PV which on each occasion are situated between two of the following situations, appearing consecutively:

a start of watercourse, for example the point V1 represented in FIG. 9;

a change of direction of the watercourse, for example the point V2 of the watercourse CA represented in FIG. 9, a change of direction V2 corresponding to the cross-over point of two adjacent principal directions;

a tributary, for example CC; and an end of watercourse.

Next, as indicated earlier, said means 6 determine, for each set E of valley points PV, a segment S which approximates said valley points PV on the basis of a least squares computation, said segment S being limited in length by the contour of said set E.

The segments S thus formed are transmitted by way of a link 13 to the means 7.

Said means 7 form, on each occasion, on the basis of two adjacent segments S, contour pieces T which make it possible to determine the final contour CV of a valley.

Represented in FIGS. 11A to 14B are various possible situations in respect of the processing of the means 7. The figures labeled with the index A represent the situation before processing, for two adjacent segments S1 and S2, and the figures labeled with the index B illustrate the corresponding piece T obtained by said processing.

Each of said segments S1 and S2 includes an end G1 and G4 respectively far from and an end G2 and G3 respectively near to the other.

More precisely, the ends G1 and G2 respectively represent the upstream and downstream ends of the segment S1, in the direction $\vec{F}$ of the flow of the water, and the ends G3 and G4 respectively represent the upstream and downstream ends of the segment S2.

Figure 11A:
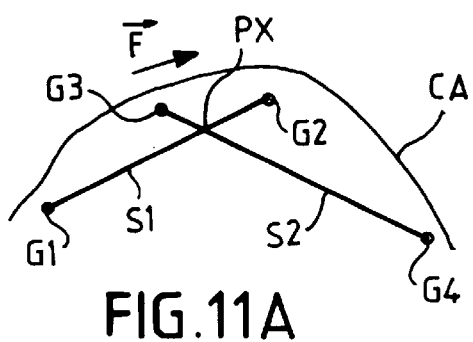
Figure 11B:
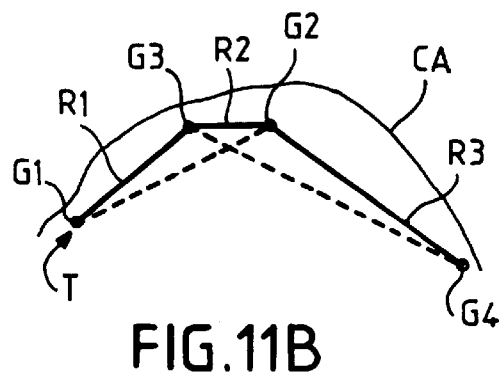
Figure 12A:
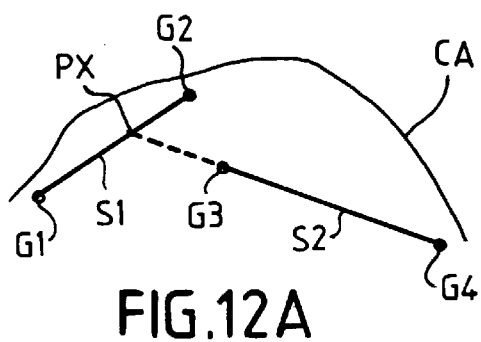
Figure 12B:
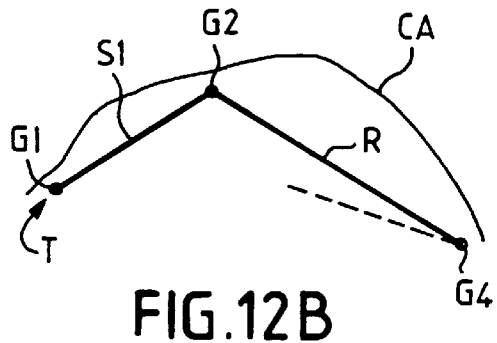
Figure 13A:
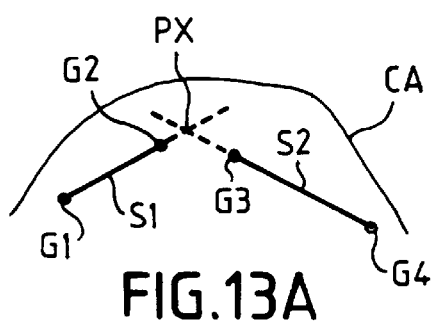
Figure 13B:
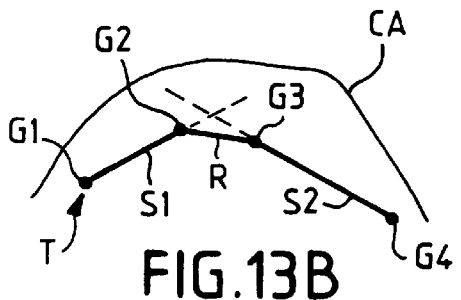
Figure 14A:
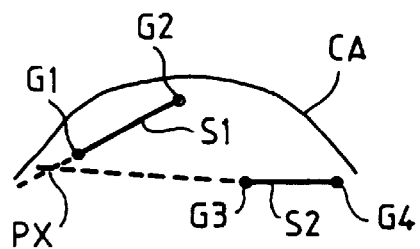
Figure 14B:
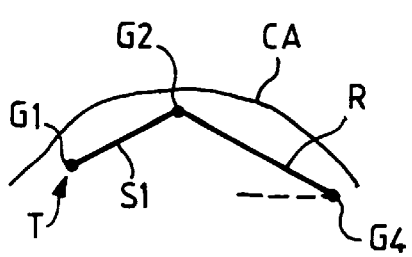

According to the invention, for each pair of adjacent segments S1 and S2, the means 7 check whether they intersect, and:

in the case in which they intersect, as represented in FIG. 11A, the contour piece T is formed from three successive straight-line portions R1, R2 and R3 which respectively join the far end G1 of the first segment S1, the near end G3 of the second segment S2, the near end G2 of the first segment SI and the far end G4 of the second segment S2, as represented in FIG. 11B; and in the case in which they do not intersect, as represented in FIGS. 12A, 13A and 14A, the means 7 determine the imaginary point of intersection PX, obtained by fictitiously extending at least one of said two segments S1 and S2; and if said point of intersection PX lies on a first S1 of said segments, as represented in FIG. 12A, the contour piece T is formed of said first segment S1 and of a straight-line portion R joining the near end G2 of this first segment S1 to the far end G4 of the second segment S2, as represented in FIG. 12B; and if said point of intersection PX does not lie on one of said two segments S1 and S2;

in the case in which it is obtained by extending the two near ends G2 and G3 of said segments S1 and S2, as represented in FIG. 13A, the contour piece T is formed of these two segments S1 and S2, together with a straight-line portion R joining the near ends G2 and G3 of these segments, as represented in FIG. 13B; and in the case in which it is obtained by extending the near end G3 of a first segment S2 and the far end G1 of the second segment S1, as represented in FIG. 14A, the contour piece T is formed of said second segment S1 and of a straight-line portion R joining the far end G4 of the first segment S2 to the near end G2 of the second segment, as represented in FIG. 14B.

The means 7 form the contour of the valleys CV on the basis of the contour pieces T thus determined, by effecting a continuity of said contour pieces T.

Figure 15:
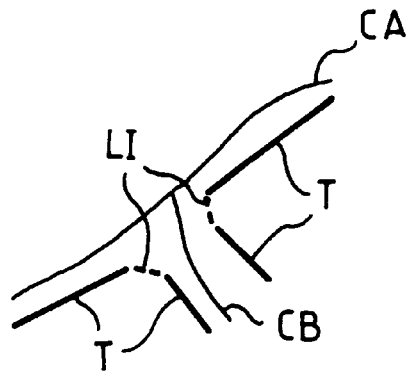
FIGS. 15 to 17 illustrate a method used for joining the adjacent contour pieces.
Figure 16:
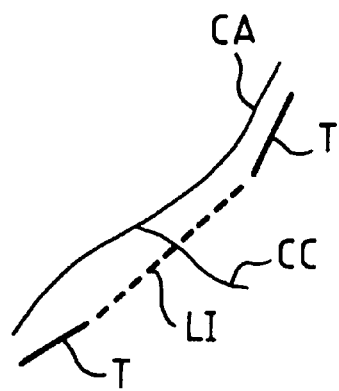

To this end, they join together said contour pieces T, especially at the tributaries, as represented in FIGS. 15 and 16.

When the tributary CB also has contour pieces T, the join lines L1 join the pieces T of the principal watercourse CA to those of said tributary CB at the point of confluence, as represented in FIG. 15.

On the other hand, when the tributary CC has no contour piece, the join lines LI join the pieces T of the principal watercourse CA directly, at the point of confluence, such as represented in FIG. 16.

Figure 17:
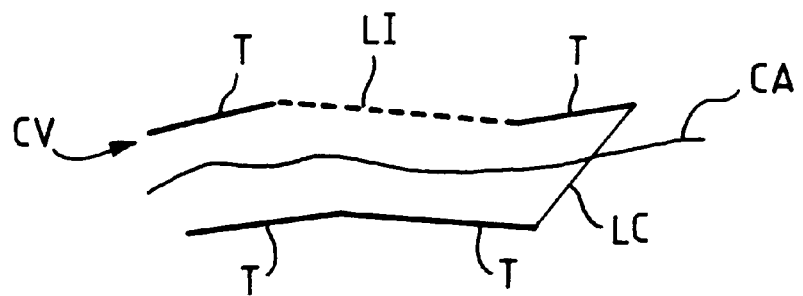

At the ends of the contour CV of a valley, the join is made by means of transverse lines LC, as illustrated in FIG. 17.

The device 1 in accordance with the invention, the processing operations of which have been specified above, therefore makes it possible to determine contours CV of valleys of a specified geographical area ZI.

Moreover, on the one hand, this device 1 can be enhanced so as in addition to determine inclines (not represented), by searching for those walls of the valleys exhibiting a slope greater than a predefined value, the valley walls thus determined forming said inclines.

On the other hand, said device 1 can be enhanced so as to determine ridge lines.

Figure 18:
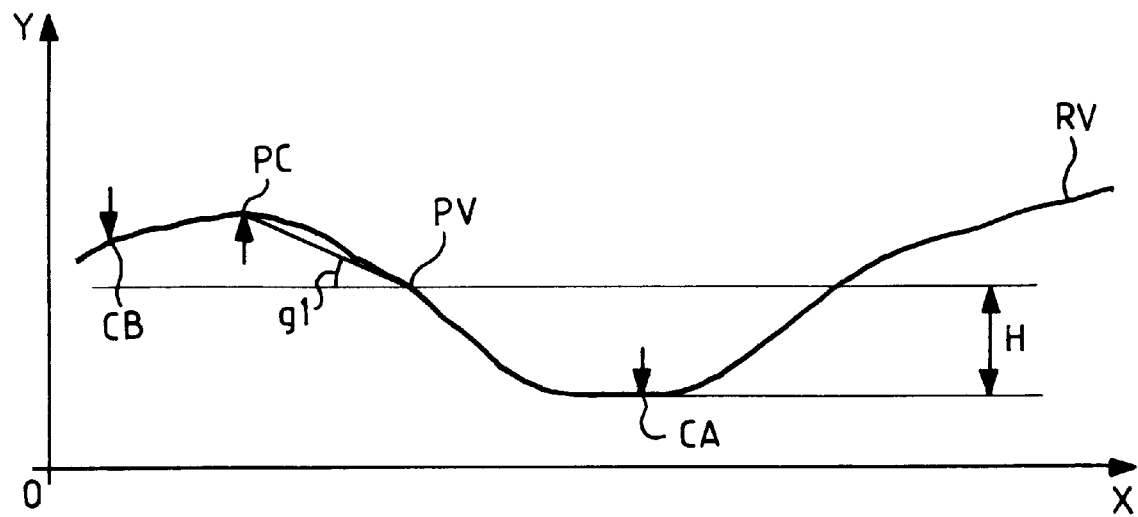
FIGS. 18 and 19 show two different relief parts by which the process in accordance with the invention for determining ridge lines may be explained.

To this end, according to the invention:

the means 5 determine, instead of valley points PV, ridge points PC represented in FIG. 18 which shows the relief RV of a valley in a vertical plane OXY, corresponding to the matrix points of said second matrix exhibiting the highest altitude;

in their processing operations, the means 6 use said ridge points PC instead of the valley points PV; and the contours formed by the means 7 then represent said ridge lines.

A ridge line joins the points of highest altitude lying between two watercourses. In the case in which there are no points higher than those which delimit one of the two watercourses, the fictitious ridge line is regarded as coinciding with this watercourse.

Furthermore, a means of filtering (not represented) can be incorporated into the device 1 so as to take into account only the sufficiently characteristic ridge points PC.

More precisely, in this respect the angle g1 between the horizontal and the line formed by the points PC and PV is regarded as having to be greater than a predefined value, for example 3°, such as represented in FIG. 18.

Figure 19:
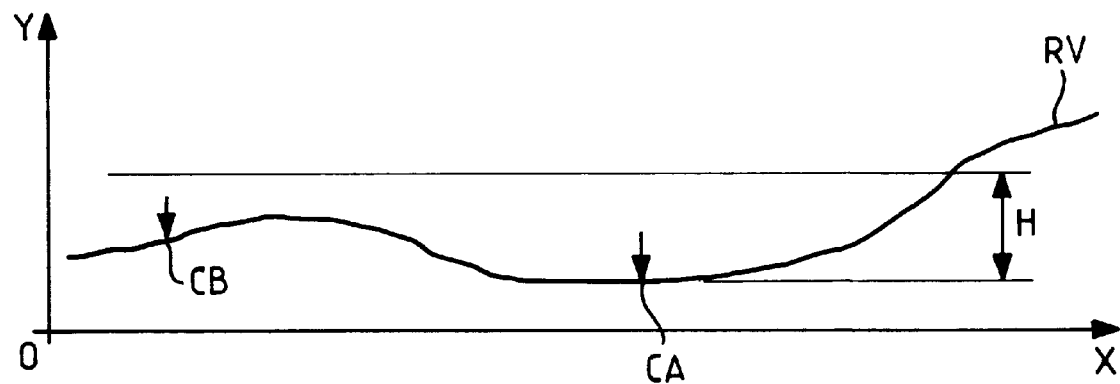

Furthermore, when, as represented in FIG. 19 which shows a vertical plane OXY illustrating a relief part RV, there is no point of the relief RV between two watercourses CA and CB, which exhibits an altitude greater than or equal to the altitude H, there are no ridge points PC, nor valley points PV, between these two watercourses CA and CB.

What is claimed is:

1. A process for determining the contour (CV) of valleys of a specified geographical area (ZI), wherein:

A/ the probable hydrographic net (RH) of said geographical area (ZI) is determined, said hydrographic net (RH) being presented in a first matrix (M) which represents said geographical area (ZI) and which includes at each matrix point, corresponding to a part of said geographical area (ZI) liable to form part of a watercourse (A, B), a characteristic code (a, b) designating said watercourse (A, B);

B/ a second matrix is formed which represents said geographical area (ZI) and which includes at each matrix point the altitude of the corresponding part of said geographical area (ZI);

C/ the tributaries and the points of confluence of all the watercourses of said hydrographic net (RH) are determined from said first matrix (M);

D/ valley points (PV) are determined in said matrices from said first and second matrices, the parts of the geographical area (ZI) corresponding to said valley points (PV) being liable to belong to a valley contour (CV);

E/ valley contour segments (S) are defined on the basis of the valley points (PV) thus determined, as well as of said tributaries and said points of confluence; and F/ said valley contours (CV) are formed on the basis of the segments (S) thus defined.

2. The process as claimed in claim 1, wherein in step A/, said hydrographic net (RH) is determined using a map display and processing unit which uses information from digitized data files of said geographical area (ZI) and which simulates the flow of rain over the relief of said geographical area (ZI).

3. The process as claimed in claim 1, wherein in step B/, said second matrix is determined from information from digitized data files of said geographical area (ZI).

4. The process as claimed in claim 1, wherein in step C/, in order to determine the tributaries, the following operations are carried out for each of the watercourses (CA) of the hydrographic net (RH):

each matrix point (A1 to A20) of said first matrix (M) labeled with the code (a) of said watercourse (CA) is taken into account in succession; and for each of the matrix points (A1 to A20) thus taken into account, the following operations are carried out:

a partial area (ZP), of predefined size, centered about said matrix point (A8) is defined in said first matrix (M);

the existence of an additional matrix point (B9) labeled with the code (b) of another watercourse (CB) is searched for within said partial area (ZP); and if such an additional matrix point (B9) is present in said partial area (ZP), it is deduced therefrom that it belongs to a tributary (CB).

5. The process as claimed in claim 4, wherein a point of confluence corresponds to the first (A8) of said matrix points (A1 to A20) taken into account in the search for a tributary, on the basis of which such a tributary (CB) is detected.

6. The process as claimed in claim 1, wherein in step D/:

a) the principal directions (Di) of said watercourses are determined in said first matrix (M);

b) said first and second matrices are superimposed; and c) on the basis of said superposition, for each water point (Ai) corresponding to a matrix point representative of a watercourse (CA), a sweep is carried out over said second matrix (M), orthogonally to the principal direction (Di) of said watercourse (CA) at said water point (Ai), in succession on either side of said watercourse (CA), while searching during this sweep, up to a predefined distance (d) from said water point (Ai), for a matrix point having a relative altitude (H) with respect to said water point (Ai) which lies within a predetermined altitude bracket, any first matrix point (PV) thus detected on the basis of the water point (Ai) corresponding to a valley point.

7. The process as claimed in claim 6, wherein, when a watercourse (CC) is encountered in the course of the sweep on one side of a principal direction (Di) of a watercourse (CA), the search for the water point (Ai) considered on this side of the principal direction (Di) is halted.

8. The process as claimed in claim 1, wherein in step E/:

a) the principal directions (D1, D2A, D2B, D3) of said watercourses (CA) are determined;

b) for each of said principal directions (D1, D2A, D2B, D3), the valley points (PV) adjacent to this latter on one side of the watercourse (CA) are grouped together so as to form a set (E) of valley points (PV); and c) for each of said sets (E) of valley points (PV), a segment (S) is determined which approximates the valley points (PV) of said set (E) and represents a valley contour segment.

9. Process as claimed in claim 6, wherein, in order to determine the principal directions of a watercourse, on the basis of water points corresponding to the matrix points of said first matrix (M) which are labeled with the code of said watercourse:

a) the two extreme water points (F1, F2) of said watercourse are determined;

b) a segment (F1F2) is formed on the basis of said extreme water points (F1, F2);

c) a search is made for the water point (F3) furthest from the segment (F1F2) thus formed;

d) two segments (F1F3, F2F3) are formed on the basis of said furthest water point (F3) and of said extreme water points (F1, F2) respectively; and e) for each of the segments (F1F3, F2F3) thus formed, the operations c), d) and e) are repeated as long as:

on the one hand, the length (L1, L2) of the segments (F1F3, F2F3) thus formed is greater than a predefined value; and on the other hand, the angles (f1, f2) between a segment (F1F2) considered in step c) and each of the segments (F1F3, F2F3) formed in the succeeding step d) are greater than a predefined value, the segments obtained at the end of said repetitive operations representing the principal directions of said watercourse.

10. The process as claimed in claim 8, wherein, in step E/b) , for a watercourse considered, the valley points (PV) which on each occasion are situated between two of the following situations, appearing consecutively, are grouped together:

a start of watercourse;

a change of direction of the watercourse, a change of direction corresponding to the crossover point (V2) of two adjacent principal directions;

a tributary; and an end of watercourse.

11. The process as claimed in claim 8, wherein in step E/c), the segment (S) which approximates the valley points of a set (E) of valley points (PV) is determined through a least squares computation.

12. The process as claimed in claim 11, wherein said segment (S) is limited in length by the contour of said set (E) of valley points (PV).

13. The process as claimed in claim 1, wherein in step F/, each valley contour (CV) is formed by contour pieces (T), and wherein each contour piece (T) is obtained from two adjacent valley contour segments (S).

14. The process as claimed in claim 13, wherein, in order to form a contour piece (T) from two adjacent valley contour segments (S), a check is made as to whether they intersect; and, each of said segments (S1, S2) containing an end (G1, G4) far from and an end (G2, G3) near to the other:

- in the case in which they intersect, the contour piece (T) is formed from three successive straight-line portions (R1, R2, R3) which respectively join the far end (G1) of the first segment (S1), the near end (G3) of the second segment (S2), the near end (G2) of the first segment (S1) and the far end (G4) of the second segment (S2); and
- in the case in which they do not intersect, the imaginary point of intersection (PX) is determined, obtained by fictitiously extending at least one of said two segments (S1, S2); and
  - if said point of intersection (PX) lies on a first (S1) of said segments, the contour piece (T) is formed of said first segment (S1) and of a straight-line portion (R) joining the near end (G2) of this first segment (S1) to the far end (G4) of the second segment (S2); and
  - if said point of intersection (PX) does not lie on one of said two segments (S1, S2):
    - in the case in which it is obtained by extending the two near ends (G2, G3) of said segments (S1, S2), the contour piece (T) is formed of these two segments (S1, S2), together with a straight-line portion (R) joining the near ends (G2, G3) of these segments; and
    - in the case in which it is obtained by extending the near end (G3) of a first segment (S2) and the far end (G1) of the second segment (S1), the contour piece (T) is formed of said second segment (S1) and of a straight-line portion (R) joining the far end (G4) of the first segment (S2) to the near end (G2) of the second segment (S1).

15. A device for implementing the process specified under claim 1, wherein it comprises:

- means (2) for forming said first matrix (M);
- means (3) for forming said second matrix;
- means (4) for determining the tributaries and the points of confluence of the watercourses of the hydrographic net (RH);
- means (5) for determining said valley points (PV);
- means (6) for defining the valley contour segments (S); and
- means (7) for forming the valley contours (CV).

16. A process for determining inclines, wherein on the basis of the valley contours determined by implementing the process specified under claim 1, the valley walls are determined which exhibit a slope greater than a predefined value, the valley walls thus determined forming said inclines.

17. A process for determining ridge lines, wherein the process specified under claim 1 is implemented, taking into account the following characteristics:

- in step D/, ridge points (PC) corresponding to the matrix points of said second matrix, exhibiting the highest altitude, are determined instead of valley points (PV);
- said ridge points (PC) are used in step E/ instead of the valley points (PV); and
- said ridge lines correspond to the contours formed in step F/.

* * * * *